Figure 1:
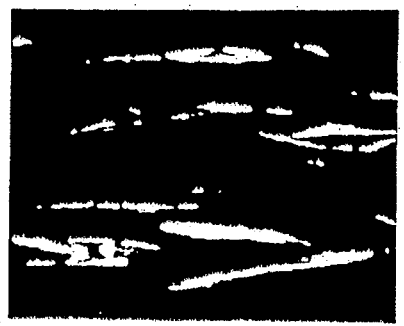

Patented May 18, 1954

2,678,879

UNITED STATES PATENT OFFICE 2,678,879

FLAKY ALUMINUM POWDER

Johannes Nüesch, Mogliano-Veneto, and Meinrad Bertschy and Secondo Galeazzi, Porto Marghera, Italy, assignors to Société Anonyme pour l'Industrie de l'Aluminium, Chippis, Switzerland Application May 9, 1952, Serial No. 286,931

Claims priority, application Switzerland May 10, 1951

4 Claims. (Cl. 75—0.5)

There are known several kinds of aluminum powder, which differ largely one from the other by their properties. One of the most important aluminum powders is the powder which is formed by very thin and small flakes and may be called "flaky aluminum powder." One obtains this flaky aluminum powder according to a dry or to a wet method. The wet method, as described for instance in the U. S. Patent No. 2,002,891 to Hall and in the U. S. Patent No. 2,193,663 to Arthur, is only suitable when the flaky powder is to be used as a pigment for paints, otherwise it would be necessary to remove the paint thinner, the leafing agent and any other organic substance added before or during the grinding, what would be an expensive process.

Flaky aluminum powder is used to-day before all as a pigment for paints. Larger quantities are also used in pyrotechnic. There are still other fields of application, such as the making of cellular concrete and the manufacture of metallized paper.

Since a few years aluminum powder is being used also in the manufacture of sintered light metal bodies of high strength even after annealing or in the heat. For this purpose the flaky aluminum powder must be free or substantially free from grease or lubricant, so that the wet method for making the powder can hardly be taken into account; moreover, the surface of the flakes must be sufficiently oxidized (oxide content of the powder for instance 10 to 15 p. c.). The finer qualities of degreased commercial flaky aluminum powder, which are generally sufficiently fine and sufficiently oxidized without further treatment, are suitable for the manufacture of the said light metal sintered bodies. From pure-aluminum flaky powder sintered bodies can be made which have in at least one direction the following properties:

| | |
|---|---|
| Yield strength | 25–30 kg./mm.$^2$ |
| Tensile strength | 30–35 kg./mm.$^2$ |
| Elongation ($\delta$10) | 5–8 p. c. |
| Brinell hardness | 80–100 kg./mm.$^2$ |

These properties are not impaired by a heating to about 200–500° C., whereas cold-worked aluminum or heat treated aluminum alloys lose, under these conditions, a great part of their yield strength, their tensile strength and their Brinell hardness. The mentioned sintered bodies have also a noteworthy mechanical strength in the heat.

The method for making these aluminum sintered bodies is set forth for instance in the following patents: Swiss Patents Nos. 250,118 and 259,878; British Patent No 625,364; German Federal Patent No. 837,467; French Patent No. 949,389; Dutch Patent No. 66,566; Italian Patents Nos. 431,577 and 435,010. The method cannot be carried out either with the so-called "atomized" aluminum powder, which is obtained by spraying molten aluminum, or with aluminum grit, because the mechanical properties of light-metal bodies obtained by compressing and sintering atomized aluminum powder or aluminum grit are far below those mentioned above. As a matter of fact, sintered bodies from atomized powder attain a yield strength of 12 kg./mm.$^2$ for instance, a tensile strength of 18 kg./mm.$^2$ and a Brinell hardness of 44 kg./mm.$^2$. Sintered bodies from aluminum grit have a yield strength of about 7 kg./mm.$^2$, and a tensile strength of 12 kg./mm.$^2$ and a Brinell hardness of 32 kg./mm.$^2$.

The fine flaky aluminum powder which is commercially available for carrying out the mentioned method for making light-metal sintered bodies has the great disadvantage of a very low bulkweight. The commercial, fine and flaky aluminum powder which is used for painting and contains grease or lubricant (for instance 2–3 p. c.) has a bulkweight of about 0.27 to 0.35 kg./litre. The corresponding flaky aluminum powder which is used in pyrotechnic and has been made under the same conditions, but has not been polished and is free or substantially free from grease (lubricant), has a bulkweight of about 0.09 to 0.2 kg./litre; this is the quality used up to the present invention for manufacturing sintered aluminum bodies with the relatively high mechanical properties mentioned above. Therefore, for making a sintered body of 10 cm. height and 2.7 g./cm.$^3$ specific weight one has to compress a column of pure-aluminum flaky powder which is from 300 to 135 cm. in height. This causes difficulties, because the press must have a very long stroke. If homogeneous sintered bodies of relatively great height are required several pre-pressed bodies (which may be obtained by cold pre-pressing) must be superimposed one upon another and then pressed together at high temperature or hot-worked together, whereby also a sintering takes place. But, if this is done, weaker spots can form at the joints of the pre-pressed bodies, which spots impair the strength of the finished body. This may be due to the fact that because of the heating the joints have a substantially higher oxide content, so that the particles do not sinter together so well at the joints as the powder particles in the other parts of the pre-pressed bodies. As is well known, it is possible to increase slightly the bulkweight of commercial flaky aluminum powder by shaking or by knocking on the wall of the container; however, after the shaking or the knocking one can no longer speak of a true bulkweight, but of an "apparent specific weight." There are commercially available flaky aluminum powders which contain substantial quantities of lubricant and the apparent specific weight of which amounts to about 0.55 kg./litre after shaking or knocking; this is to our knowledge the highest value which can be obtained with commercial fine, polished and lubricant-containing flaky aluminum powder.

In the book "Aluminum Bronze Powder and Aluminum Paint" of Junius David Edwards, published 1927 by "The Chemical Catalog Company, Inc.," New York, U. S. A., there is given for flaky aluminum powder a bulkweight of 0.7 g./litre and lower. The product with a bulkweight of 0.7 kg./litre was doubtless a powder for painting purposes, which was polished and had a substantial content of lubricant. A corresponding flaky aluminum powder free or substantially free from lubricant would have had a bulkweight of only 0.2–0.3 kg./litre. It may be that the flakes of that powder were relatively thick and the oxide content because of the too small ratio flake surface to flake volume too low for the manufacture of sintered aluminum bodies with the high mechanical properties mentioned above. Such a lubricant-containing flaky aluminum powder with a bulkweight of 0.7 kg./litre is since a long time no more commercially available already for the reason that it has a much lower covering area than the finer and lighter powders which are manufactured at present.

Our present invention relates to a process for manufacturing a flaky aluminum powder the particles of which have a lamellar structure (slate-like structure), which powder has in spite of a lubricant-content below 0.3 p. c. a bulkweight of at least 0.7 kg./litre, preferably of 0.8 kg./litre or more. This flaky aluminum powder has an aluminum oxide content of at least 6 p. c., preferably 10 to 15 p. c. (The aluminum oxide content mentioned in the present specification and in the claims is that formed by the oxide skin which covers the flakes, but not by aluminum oxide added to the aluminum powder; aluminum oxide added subsequently to the aluminum powder, for instance in form of ground aluminum-oxide powder, would not contribute to the mechanical strength of the sintered body.) Aluminum powder with less than 6 p. c. aluminum oxide gives sintered bodies with insufficient mechanical strength. Sintered bodies made from aluminum powder with more than 15 p. c. aluminum oxide are difficult to form, that is to say that their forming property is bad. However, aluminum powder with more than 15 p. c. aluminum oxide may still be used if sintered bodies have to be made by simple forming operations.

Our invention relates also to the new flaky aluminum powder with a lubricant-content below 0.3 p. c., an aluminum oxide content of at least 6 p. c. and a bulkweight of at least 0.7 kg./litre, preferably of 0.8 kg./litre or more.

A flaky aluminum powder according to our present invention was hitherto unknown, especially because there was no need for a powder having such a quality.

Our method is characterized by the fact that during the manufacture by blows (by stamping or hammering or in the ball mill) the raw material is treated in such a manner that actually single flakes are obtained which have the same or nearly the same fineness as the flakes of commercial flaky aluminum powder, but that most of these flakes are welded together to larger particles so that a flaky powder of the desired higher bulkweight is obtained.

This aim can be attained by carrying out the comminuting operation by blows (by stamping or hammering or in the ball mill) in presence of a quantity of lubricant smaller than the quantity generally added for obtaining a light flaky aluminum-powder with good leafing and covering property and for preventing the aluminum particles from welding together during the comminuting operation. Usually there are added 1.5–5 p. c. stearic acid, ricinoleic acid, lard oil, tallow or other lubricants with similar properties.

According to the U. S. Patent No. 2,017,851 to Boothman an amount of 4 p. c. of lubricant is generally preferable; sometimes, as when making coarse powders, quantities of lubricant as low as 2 p. c. of the weight of the metal give satisfactory results.

We succeeded in obtaining by our new process a flaky aluminum powder with a bulkweight of at least 0.7 kg./litre by using an amount of lubricant below 1 p. c. of weight, preferably of not more than 0.8 p. c. The single particles become sufficiently comminuted in spite of the smallness of the lubricant-addition; most of them weld together to larger particles having a lamellar structure (slate-like structure) which in spite of their size contain sufficiently aluminum oxide (at least 6 p. c.). This higher oxide content, the amount of which is necessary for the manufacture of the sintered bodies with good mechanical strength in the heat, is actually due to the fact that most of the particles of the flaky aluminum powder according to our invention are not homogeneous but have a slate-like structure; that is to say that they consist of a plurality of very fine lamellae which are welded together here and there and have all an extremely thin film of amorphous aluminum oxide which is less than 0.01 micron in thickness. This is a surprising fact which could not be observed before because the particles were from the first prevented from welding together, that is to say from the beginning of the comminuting operation by stamping or in the ball mill.

This new flaky aluminum powder according to our invention is mostly suitable for the manufacture of sintered aluminum bodies of good mechanical strength in the heat.

Fig. 1 shows in 1000-fold magnification a commercial flaky aluminum powder which has been substantially degreased for pyrotechnic purposes and has a lubricant (stearic acid) content of 0.2 p. c. and an aluminum-oxide content of 11 p. c. The powder is embedded in plastic; the visible flakes are cut perpendicularly or nearly perpendicularly. This powder has a bulkweight of 0.12 kg./litre.

Figure 2:

Fig. 2 is a microscopic section (taken in the same manner as Fig. 1 and in 1000-fold magnification) of a flaky aluminum powder made according to our invention, containing 0.2 p. c. stearic acid and 11 p. c. aluminum oxide and having a bulkweight of 0.85 kg./litre. The single flakes have approximately the same size and also the same thickness as in the powder shown in Fig. 1; but as most of them are welded together, the powder particles are much greater than in Fig. 1. The higher bulkweight is due to the welding together of the flakes.

Figure 3:
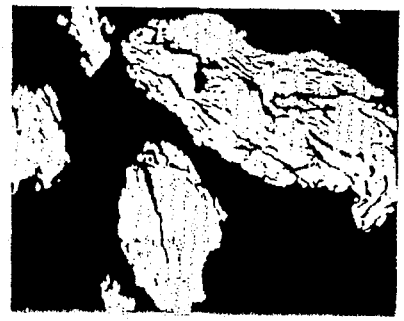

Fig. 3 shows some coarser particles of the same powder as in Fig. 2. The microscopic section was taken in the same manner and with the same magnification as Figs. 1 and 2.

The mentioned lubricant-content (stearic acid content) comprises the free stearic acid and the aluminum stearate, which always forms to a certain extent during the manufacture of the flaky powder if stearic acid is used as lubricant. Other fatty acids give of course instead of the stearate the corresponding aluminum salts.

If one considers under the same conditions as in Figures 1 to 3 flaky aluminum powders with substantial lubricant-content for painting purposes, one can observe formations which at a first glance seem to be similar to the coarser powder particles shown in Figures 2 and 3 and consisting of single flakes welded together. However the single flakes of that commercial flaky aluminum powder are not welded together, but stick together because of the lubricant; they separate as soon as they are introduced into a solvent for the lubricant, for instance into white spirit. This greasy powder is wholly unsuitable for the manufacture of sintered aluminum bodies of high mechanical strength in the heat.

According to a further improvement of our invention the flaky aluminum powder is not comminuted in one course, that is to say without substantial pauses during the comminuting process according to our invention or between the single comminuting steps, or even without any interruption, but on the contrary, preferably one storage of several weeks, suitably of four weeks or more, is intercalated, what warrants the obtention of a guaranteed oxide-content and the avoidance of a substantial subsequent oxidation. Furthermore this storage contributes to avoid with rather certainty the danger of explosion. Of course, one must try to obtain for the manufacture of sintered aluminum bodies of high mechanical strength in the heat a flaky aluminum powder which does not undergo substantial changes or even any change during a long storage. If one does not intercalate a pause of several weeks during the manufacture of the powder according to the method of our invention, it is not possible to obtain with certainty a substantially inalterable flaky aluminum-powder. If then such a powder is not used all at once, sintered bodies are obtained which by their properties differ more or less one from the other. But even if it is intended to use the powder all at once, it is desirable that the success does not depend on the fact whether the powder has been stored for a more or for a less long time in the sintering shop.

As with the making of the light flaky aluminum-powder hitherto used for the manufacture of sintered aluminum bodies of high mechanical strength in the heat, it is possible to use for carrying out our invention low alloyed aluminum instead of pure aluminum without substantially impairing the result.

The manufacture of the heavier flaky aluminum powder according to our invention can be carried out in the usual machines, for example in stampers or in a ball mill as it is described for instance in the Swiss Patents No. 105,987 and No. 176,695, in the U. S. Patent No. 1,785,283 to Podszus and in the British Patent No. 430,777.

The amount of lubricant used in carrying out the method according to our present invention is chosen to conform to the desired effect as well as to the raw material and to the operating steps. It must be smaller than 1 p.c. and may lie for instance between 0.2 and 0.8 p.c. (Here as well as everywhere in the present specification and in the claims there is question of percents of weight, in no case of percents of volume.) The mostly used fatty acids, for instance stearic acid, convert partially (as already stated in the present specification) into the corresponding aluminum salts during the manufacture of the flaky aluminum powder and remain as such on the surface of the aluminum. This may be proved for instance by treating the finished powder with an organic solvent for the lubricant: the unaltered fatty acids dissolve whereas the fatty aluminum salts remain undissolved.

As to the raw material for carrying out our present invention, one may use very well the flat bodies obtained by dropping molten aluminum on a cooled disc rotating on a vertical axis. However, one may start also from small scraps of foil as well as from other more or less comminuted raw materials such as used for manufacturing flaky aluminum powder for painting.

The following examples illustrate our invention. Of course, the invention may be carried out in many other ways.

*Example 1*

Small scraps of aluminum foil of a purity of 99.2 to 99.5 p. c. are used as raw material. At first and after addition of 0.4 p. c. stearic acid they become comminuted in so-called round-stampers well known to those skilled in the art and illustrated for instance in the book "Technologie des Aluminums und seiner Legierungen" of A. von Zeerleder, published by Akademische Verlagsgesellschaft, Leipzig, 5th edition, page 417. The material is ground first to a size of 0 to 3.3 mm. and then to a size of 0 to 0.7 mm. Thereafter the material is introduced in portions of 30 to 40 kg. and without further addition of lubricant into a ball mill of the already mentioned type and ground therein during 10 hours under a protecting gas (consisting for instance of 92–95 p. c. nitrogen and 8–5 p. c. oxygen). The flaky aluminum powder obtained has a lubricant content of about 0.2 p. c., an aluminum oxide content of about 12 p. c. and a bulkweight of about 7 kg./litre. Similar results can be obtained with somewhat greater additions of lubricant, for instance 0.6 p. c., 0.7 p. c. or 0.8 p. c. Greater charges necessitate a longer time for grinding in the ball mill. By varying the fineness of the material introduced into the ball mill, the duration of grinding, the weight of the charge and the amount of lubricant one may vary the oxide content, the lubricant content and the bulkweight. For example, the aluminum oxide content may amount to 8–15 p. c. or even more. The bulkweight can be increased up to 1.5 kg./litre and the lubricant content vary between 0.15 and 0.3 p. c.

*Example 2*

Aluminum of 99.6 p. c. purity, containing 0.22–0.28 p. c. iron and 0.12–0.14 p. c. silicon, is used as raw material. The transformation into the desired flaky powder with higher bulkweight for sintering purposes is done in 8 operating steps.

In the first operating step strips of 10–15 cm. length, 1–2 cm. breadth and 0.1–0.2 mm. thickness are made in a special casting device. This device comprises an internally cooled metallic plate rotatable on a vertical axis and above the said plate a reservoir for molten aluminum having a plurality of spaced holes in the bottom thereof through which the metal drops on the rotating plate. The solidified aluminum strips formed in this way are thrown laterally away in consequence of the centrifugal force and collected.

In the second operating step the strips obtained in the first step are transformed in stampers (round stampers) after addition of 0.4 p. c. pulverized stearic acid to flakes of 0–3.3 mm. The stamper comprises a kind of large mortar and 12 pestles weighing each 45 kg. and disposed on a circle. The pestles have a stroke of 90 mm. and the worm spindle for lifting the pestles a number of revolutions of 80 per minute. The stamper has an output of about 3.6 kg. flakes per hour; it is filled up periodically with raw material. The size of the flakes is determined by screens which are disposed in the throwing-out openings.

In the third operating step, after a second addition of 0.4 p. c. stearic acid, the flakes obtained in the second step are further comminuted to a size of 0–0.7 mm. in a stamper similar to that utilized in the second step. The output amounts to 4 kg. flakes per hour.

In the fourth operating step the flakes of a size of 0–0.7 mm. are further comminuted to powder particles of a size of 0–0.057 mm. in a ball mill. The said ball mill has an inner diameter of 60 cm., a length of 3.5 m. and is provided in the inside with 6 longitudinal ribs. The number of revolutions is 38 per minute. The ball mill contains 1500 kg. steel balls having a diameter of 5.6 mm. The powder is discharged continuously and pneumatically on a sifter consisting of a bronze web having a mesh-size of 0.057 mm. The coarser material which does not pass the sifter is reintroduced into the ball mill. The grinding is carried out in a well known manner under a protecting gas with little addition of oxygen, as described for instance in the Swiss Patent No. 158,013, in the French Patent No. 716,707, in the German Patent No. 619,624 and in the Italian Patent No. 299,324. In this step no stearic acid is added. The output of the ball mill amounts to about 12 kg. per hour. The powder obtained in this step has a lubricant content of 0.4 to 0.6 p. c. and an aluminum oxide content of 4.5 to 5.5 p. c. A part of the lubricant added in the stampers (0.8 p. c. on the whole) becomes used up by oxidation and by conversion into aluminum salts during the comminution. At the screen analysis one obtains the following residues:

| Tyler sieve No. | Size of particles, p. c. |
| --- | --- |
| 170 | 0.4– 2.0 |
| 250 | 3.2–16.4 |
| 270 | 5.1– 4.6 |
| 325 | 32.5–17.8 |
| 400 | 20.0–20.4 |
| Passed: 400 | 37.0–30.4 |

Now a fifth operating step is intercalated, which consists in dry storing the powder in contact with air till the lubricant content has decreased to 0.35–0.4 p. c. This storage lasts 4–8 weeks.

In the sixth operating step the stored material is further comminuted in the ball mill under a protecting gas (for instance 92–95 p. c. nitrogen and 8–5 p. c. oxygen) to a fineness of 0–0.035 mm. The working up is carried out with charges of about 35 kg. The grinding time is 5 hours. At the end of this grinding step the powder is discharged pneumatically. The flaky powder obtained has the following characteristics:

Lubricant content_____ 0.20–0.25 p. c.
Aluminum oxide content_____ 9–10.5 p. c.
Bulkweight, about_____ 0.85 kg./litre In the seventh operating step the powder discharged from the ball mill is passed through a sieve with a mesh size of 0.12 mm. for the purpose of removing foreign particles, for instance fragments of steel balls (it happens sometimes that a ball breaks in the ball mill).

The eighth operating step consists in storing the powder during about 2 to 3 months. The lubricant content decreases still by about 0.05 p. c. The aluminum oxide content increases by 1–1.5 p. c.; without intermediate storage (fifth operating step) it would much more increase. The powder obtained has the following characteristics:

Lubricant content_____ 0.15–0.20 p. c.
Aluminum oxide content_____ 10–12 p. c.
Bulkweight_____ 0.85 kg./litre The substantially grease-free (lubricant-free) flaky aluminum powder with higher bulkweight according to our invention is not suitable as a pigment for paints as it has only a poor leafing property, but is an excellent raw material for the manufacture of sintered light-metal bodies with good mechanical strength in the heat. If one desires to make a cylindrical sintered body of 10 cm. height and a specific gravity of 2.7 g./cm.$^3$ from this powder, a column of, for instance, 27 cm. to at most 40 cm. in height instead of from 135 to 300 cm. (as with the degreased commercial flaky aluminum powder) has to be compressed. The advantages are obvious. Much smaller strokes are necessary than with use of normal degreased flaky aluminum powder, so that also high bodies can be made without piling up pre-pressed bodies and therefore without inhomogeneous weaker spots. Such a flaky aluminum powder with higher bulkweight is also more advantageous for transportation and storage than the light commercial, degreased flaky aluminum powder, as the required space is smaller. Moreover, less powder escapes between the container and the punch during compression.

The determination of the pure grease-content (pure lubricant-content, the fatty aluminum salt being not included) is carried out according to the following receipt: 5 g. aluminum powder are introduced with pure, distilled ethylic ether into a 300 cm.$^3$ glass flask and then submitted to extraction by gently boiling during 3 hours under a reflux condenser. The flask is then placed obliquely and its content allowed to cool and the aluminum powder to settle (1 hour). Thereafter the supernatant liquid is poured through a filter into a larger glass flask and the aluminum and the aluminum powder submitted to a second extraction with ethylic ether. After washing the filter the collected etheric extracts are gently heated in portions in a weighted 10 cm.$^3$ glass flask for removing the ether. Then the lubricant residue is dried at first cautiously at a pressure slightly below the atmospheric by putting the glass flask into a vacuum evaporator heated from the outside with hot water and finally at the full vacuum of a water-jet injector; during this drying operation the inner temperature of the vacuum evaporator should not surpass 40° C. After an hour of drying the glass flask containing the lubricant is placed near by the balance for a quarter of an hour and then weighted. In this way one determines the free-lubricant content.

For determining the total lubricant or grease content (including aluminum salts of fatty acids) we operate in the following manner:

10 g. aluminum powder and 100 cm.³ distilled water are introduced into a 1000 cm.³ Erlenmeyer glass flask and thereafter 120 cm.³ concentrated hydrochloric acid solution of 38 p.c. in little portions at room temperature. The hydrochloric acid solution is added in a manner to avoid a too violent reaction. After dissolution of the whole metal the flask is cooled and the lubricant extracted 3 times with about 75 cm.³ ether. The separation of the ether from the aqueous solution is done by means of a separatory funnel. The etheric solution is then washed twice with distilled water, poured into a 500 cm.³ Ernelmeyer glass flask and treated with anhydrous sodium sulphate. Thereafter the etheric solution is separated from the sodium sulphate by decanting and poured into a weighted 100 cm.³ flat-bottom glass flask; the ether is then evaporated through a distilling tube on a water bath. Then the glass flask with the residue is placed for 5 minutes into a drying oven heated to 100° C. Afterwards the glass flask is put into a vacuum exsiccator and thin air sucked during one hour through the said exsiccator. The air cock is then shut and the exsiccator evacuated during a further hour (waterjet injector). After cooling the glass flask is weighted with the residue and the total lubricant content determined in this manner.

The aluminum-oxide content of the aluminum powder results from the balance after the gas-volumetric determination of the metal content. About 1 g. aluminum powder is dissolved in a 2.5 p. c. solution of sodium hydroxide and the produced gas volume (hydrogen) read by means of a graduated burette. The calculation of the aluminum content is based on the following equation:

$$2Al + 6NaOH = 2Al(ONa)_3 + H_2$$

Of course the iron content must be subtracted from the balance as iron does not dissolve in sodium hydroxide solution. Silicon dissolves in sodium hydroxide solution and hydrogen is produced by the reaction; but the silicon content is generally so low that it can be neglected in the calculation of the aluminum content. Fatty acids and their aluminum salts dissolve in the sodium hydroxide solution and do therefore not interfere with the aluminum oxide determination.

What we claim is:

1. An aluminum powder mainly composed of single lamellar aluminum particles consisting of flakes being weld-connected at spaced surface spots and having aluminum oxide films entrapped between said flakes, said powder having a bulk weight of at least 0.7 kg./litre, an aluminum oxide contents of 6 to about 15 per cent and a total lubricant contents of less than 0.3 per cent.

2. An aluminum powder mainly composed of individual lamellar aluminum particles consisting of flakes being well-connected at spaced spots and having aluminum oxide films entrapped between said flakes, said powder having a bulk weight of at least 0.7 kg./litre, an aluminum oxide contents of 6 to about 15 per cent and a total lubricant contents of less than 0.3 per cent.

3. An aluminum powder mainly composed of individual lamellar aluminum particles, consisting of flakes being well-connected at spaced spots and having aluminum oxide films entrapped between said flakes, said powder having a bulk weight of between 0.7 to 1.5 kg./litre, an aluminum oxide contents of 6 to about 15 per cent and a total lubricant contents of less than 0.3 per cent.

4. In an aluminum powder according to claim 1, the lubricant contents being essentially composed of a free lubricant and any aluminum salt of a fatty acid.

References Cited in the file of this patent

FOREIGN PATENTS

| Number | Country | Date |
| --- | --- | --- |
| 625,364 | Great Britain | June 27, 1949 |

OTHER REFERENCES

Treatise on Powder Metallurgy, vol. 1, page 41. Edited by Goetzel. Published in 1949 by Interscience Publishers, Inc., New York.